UNITED STATES PATENT OFFICE.

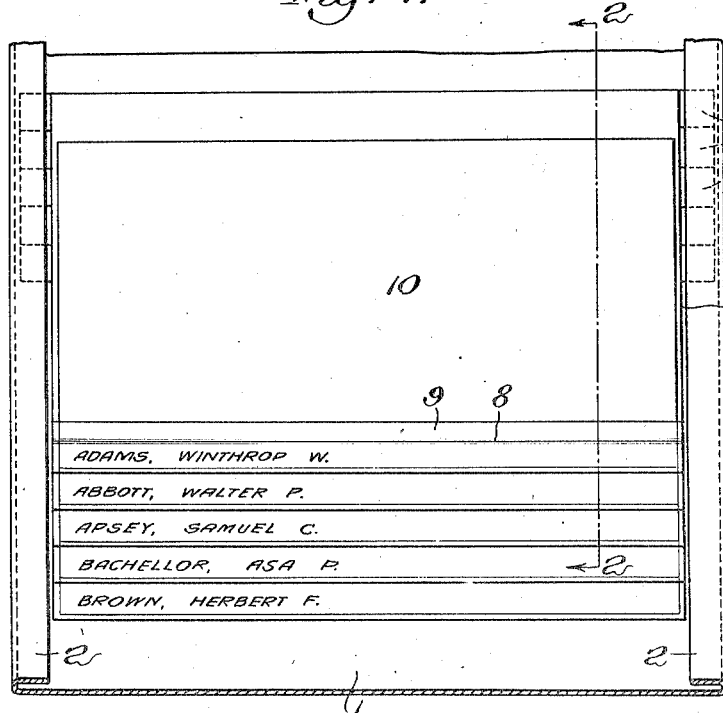
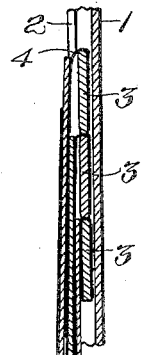
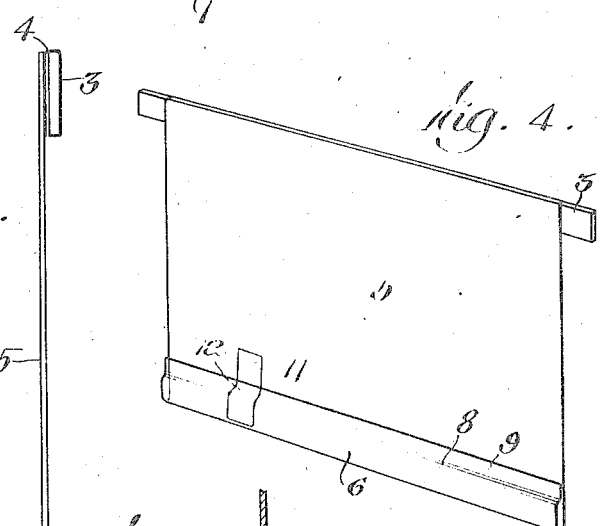
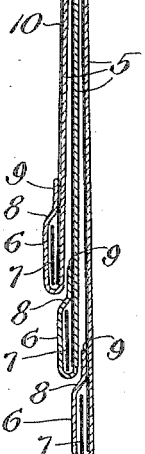
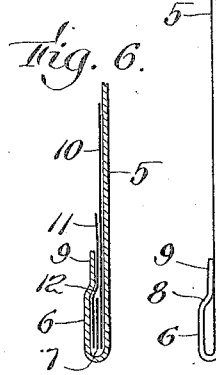
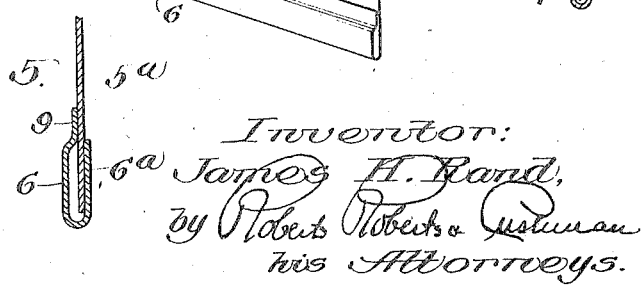

JAMES H. RAND, OF NORTH TONAWANDA, NEW YORK.

INDEX.

1,302,849.　　　Specification of Letters Patent.　　　Patented May 6, 1919.

Application filed April 16, 1918. Serial No. 228,851.

*To all whom it may concern:*

Be it known that I, JAMES H. RAND, a citizen of the United States of America, and resident of North Tonawanda, in the county of Niagara and State of New York, have invented new and useful Improvements in Indexes, of which the following is a specification.

This invention relates to visible indexes, so-called, of the kind having overlapping index elements supported in a frame in spaced relation with their free margins exposed to view.

In the accompanying drawings which illustrate certain embodiments of the invention,—

Figure 1 is a face view of part of an index containing the invention;

Fig. 2 is a section on line 2—2 of Fig. 1;

Fig. 3 is a side or edge elevation of one of the index elements;

Fig. 4 is a perspective view of one of said index elements;

Fig. 5 is a fragmentary view in section of a modification; and

Fig. 6 is a fragmentary view in section showing a signal hereinafter described.

1 is a sheet metal frame having inturned flanges 2, 2, forming opposed channels to receive and hold the ends of a series of supporting members to which the index elements are attached. The supporting members as herein shown consist of rails 3, and constitute also the means for spacing the index elements so that their free margins will project one beyond another. The particular form of supporting and spacing means constitutes no part of the present invention and may be of any desired construction. Attached to the several supporting members 3, as by hinges 4 made of textile fabric, is a series of index elements overlapping one another as shown. The form of attachment of the index elements to the supporting members constitutes no part of this invention, and any mode of attachment may be used which permits the free edge of the index elements to be swung away from the frame to expose underlying elements.

Each index element comprises a body 5 of sheet material, having at its free margin a bent over lip 6, preferably of transparent sheet material such as celluloid, extending inwardly from the edge of the index element, and spaced therefrom to form with the face of the element a sheath or pocket of suitable dimensions to receive an index strip 7 of paper or other appropriate material on which may be inscribed a name or other identifying matter. The sheath or pocket thus formed occupies the projecting or exposed margin of each index element. The margin of lip 6 is bent inwardly at the inner side of the sheath portion toward the face of the index element, and at an incline therewith, closing the inner side of the sheath or pocket as shown at 8. The inclined wall 8 forms a bevel surface at the inner side of the sheath, over which the edge of the next overlying index element will readily slip without catching when the elements are swung forward away from the frame. From the inner extremity of wall 8 the margin of the lip is reversely bent and lies flat against the face of the index element and extends flatwise thereof beyond the free edge of the next overlapping element, so that the several elements cannot catch on the edges of the lips when they are swung forward.

Preferably the body of the index element and the bent over lip are integrally made, as shown in Figs. 2, 3, and 4, of transparent sheet celluloid. The body and lip may be made, however, in separate pieces as shown in Fig. 5, in which case the body 5ª might be of paper, cardboard, or other sheet material and only the lip 6 of sheet celluloid or other resilient sheet material secured by a flap 6ª to the margin of the body 5ª. In either case the lip 6 is resilient and exerts a yielding pinch against the face of the index element, to grip a card insert or record sheet 10, which may be slipped under the flat margin 9 of the lip and held in the pocket by the gentle pressure or pinch of the lip.

If desired a signal 11 may be held by the sheath as shown in Figs. 4 and 6. The signal is made of sheet material such as paper or celluloid and is bent at 12 to conform to the shape of the sheath, the lower end extending down in front of the index strip 7. The signal may be shifted lengthwise of the sheath to the desired position, and by reason of its bend it will be held in the sheath when the card 10 is pulled out from under the lip 9.

I claim:

1. An index comprising a frame, a series of supporting members mounted in the frame, and a series of index elements of sheet material attached to the supporting members in overlapped spaced relation with their free margins projecting one beyond another, the free margin of each element being provided with a lip extending inwardly from the edge of the index element and spaced therefrom to form a sheath or pocket, the margin of the lip being bent inwardly toward the face of the index element and closing the inner side of the sheath or pocket, and thence being reversely bent and extending flatwise against the face of the index element under the free edge of the next overlapping element.

2. An index comprising a frame, a series of supporting members mounted in the frame, and a series of index elements of sheet material attached to the supporting members in overlapped spaced relation with their free margins projecting one beyond another, the free margin of each element being provided with a lip extending inwardly from the edge of the index element and spaced therefrom to form a sheath or pocket, the margin of the lip being bent inwardly toward the face of the index element and closing the inner side of the sheath or pocket, and thence being reversely bent and extending flatwise against the face of the index element under the free edge of the next overlapping element, said lip being made of resilient sheet material exerting a yielding pinch against the face of the index element.

3. An index comprising a frame, a series of supporting members mounted in the frame, and a series of index elements of sheet material attached to the supporting members in overlapped spaced relation with their free margins projecting one beyond another, the free margin of each element being provided with a lip extending inwardly from the edge of the index element and spaced therefrom to form a sheath or pocket, the margin of the lip being bent inwardly toward the face of the index element at an incline therewith forming a bevel surface at the inner side of the sheath or pocket, and thence being reversely bent and extending flatwise against the face of the index element under the free edge of the next overlapping element.

4. An index element of sheet material having at its margin a bent over lip extending inwardly from the edge of the index element and spaced therefrom to form a sheath or pocket, the margin of the lip being bent toward the face of the index element and closing the inner side of the sheath or pocket, and thence being reversely bent and lying flat against the face of the index element, said bent over lip being unattached to the body of the index element thereby providing an unobstructed entrance to the pocket through which an insert may pass edgewise into the pocket.

5. An index element of sheet material having at its margin a bent over lip extending inwardly from the edge of the index element and spaced therefrom to form a sheath or pocket, the margin of the lip being bent toward the face of the index element and closing the inner side of the sheath or pocket, and thence being reversely bent and lying flat against the face of the index element, and a movable signal of sheet material held by the sheath, bent to conform to the shape of the front of the sheath.

Signed by me at Boston, Massachusetts, this twelfth day of April, 1918.

JAMES H. RAND.